K. HERTWIG & F. COLLISCHONN.
ELECTRIC MACHINERY.
APPLICATION FILED MAY 6, 1903.

996,762.

Patented July 4, 1911.
2 SHEETS—SHEET 1.

Witnesses
J. Adolph Bishop
C. S. Brown.

Inventors
K. Hertwig and
F. Collischonn
by Foster Freeman, Watson & Coit
Attorneys

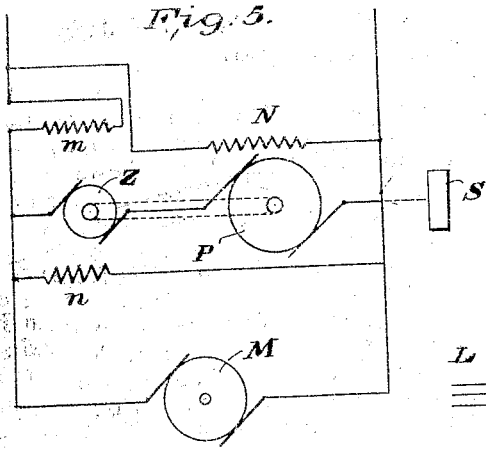
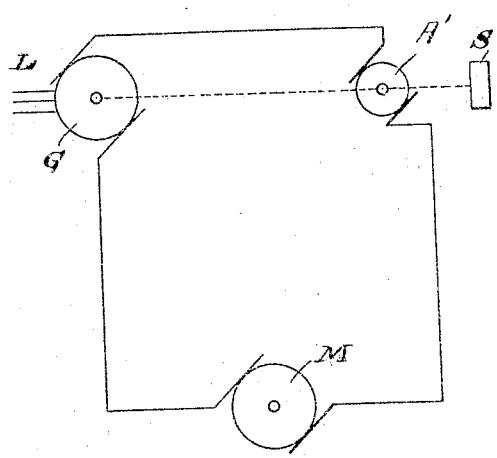
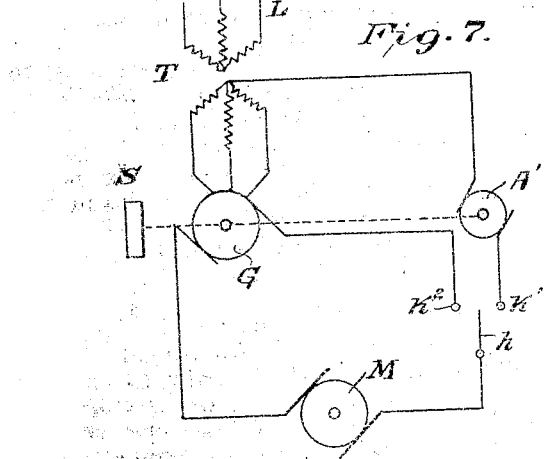
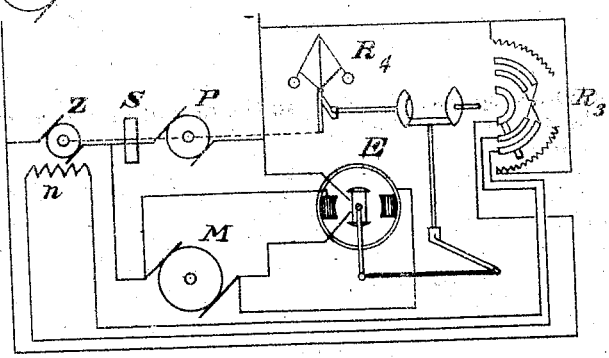

UNITED STATES PATENT OFFICE.

KARL HERTWIG AND FRIEDEL COLLISCHONN, OF FRANKFORT-ON-THE-MAIN, GERMANY, ASSIGNORS TO ELECTRICITÄTS ACTIEN GESELLSCHAFT VORM. W. LAHMEYER & CO., OF FRANKFORT-ON-THE-MAIN, GERMANY.

ELECTRIC MACHINERY.

996,762.   Specification of Letters Patent.   Patented July 4, 1911.

Application filed May 6, 1903. Serial No. 155,893.

*To all whom it may concern:*

Be it known that we, KARL HERTWIG and FRIEDEL COLLISCHONN, both subjects of the German Emperor, resident and having our post-office address at 45 Hoechsterstrasse, Frankfort-on-the-Main, Germany, have invented certain new and useful Improvements in Electric Machinery, of which the following is a specification.

In electric machinery in which the working and stopping of the driving motor takes place at frequent intervals, for example, motors which are used for operating winding machinery at collieries and in similar applications, the irregular demand upon the source of electrical energy gives rise to many difficulties. In such cases the driving engine is subjected to heavy fluctuations of load, and the demand upon the source of electrical energy is very irregular for the reason that during the periods of rest no energy is consumed, while during the working periods a considerable amount of energy may be consumed, the consumed energy being especially great when starting the motors, the starting current reaching a considerable magnitude even on a small load.

Arrangements to overcome these difficulties have been proposed but have not resulted in anything of practical value because in the proposed arrangements the compensating machine worked at a constant potential, and the energy storing devices were not free to move so as to allow the complete utilization of the energy contained in them.

This invention provides means whereby the fluctuations of the current supplied to electric machines which are called periodically into action are compensated for by a compensating machine in such manner that the work is stored and can be fully utilized down to the amount corresponding to the zero speed of the compensating machine.

The invention is applicable to both direct and alternating current motors.

The invention will be described as applied to electrical winding machinery, from which its general application will be understood.

Figure 1:
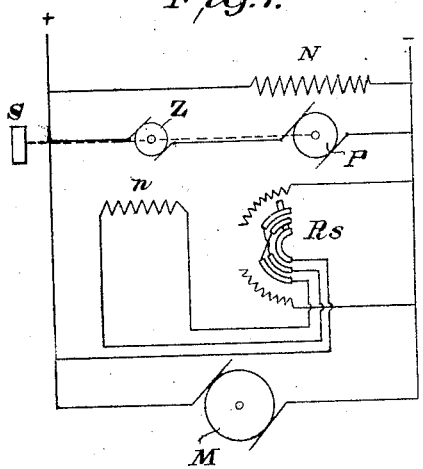
Figure 2:
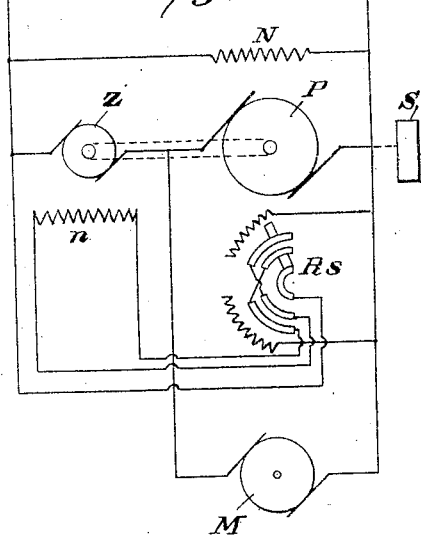
Figure 3:
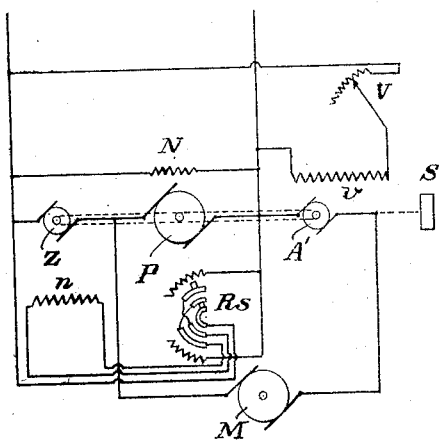
Figure 4:
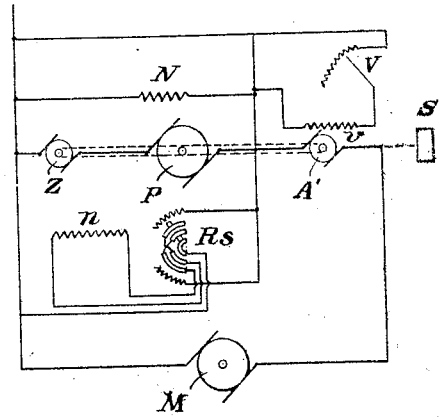

In the accompanying drawings, Figure 1 is a diagram showing one arrangement of apparatus according to our invention; Fig. 2 is an arrangement similar to Fig. 1, except that the auxiliary machine is outside of the connections of the main motor to the compensating machine; Fig. 3 illustrates connections similar to those shown in Fig. 2, except that an additional starting machine in series with the main motor has been added; Fig. 4 is a diagram showing connections similar to those illustrated in Fig. 3, except that in this figure the auxiliary machine is connected inside of the connections of the main motor with the supply means; Fig. 5 is a diagram showing automatic controlling means. Fig. 6 is a diagram showing the manner of connecting up the apparatus when the current is obtained from an alternating current source by means of a rotary converter. In this device the rotary converter also acts as the compensating machine, while the starting motor fulfils the function of the auxiliary machine; Fig. 7 is also a diagram of connections in which the supply of current for the main motor is obtained from alternating current mains by means of a rotary converter; and Fig. 8 illustrates connections whereby automatic control is effected in a manner as will be hereinafter set forth.

Referring to the drawings, the working motor M derives its energy from plus and minus mains as shown. The starting of the motor is effected in any suitable way, for instance, by the insertion of resistance or counter electromotive force in the main circuit and gradually reducing it to zero in the case of a continuous current supply, or by the equally well known starting transformer in the case of an alternating current supply.

Referring to Fig. 1, P is a compensating machine connected to an energy storing mass S. The machine P is started from the mains as a motor and afterward may be made to operate as a generator, driven by the energy storing mass, by increasing its field excitation and thereby raising its voltage above that of the line. The motor M is also adapted to receive current from the compensating machine P. An additional or auxiliary machine Z being in series with the compensating machine P, the voltage generated in the auxiliary machine will be added to or subtracted from that of the compensating machine according to its sign and in varying amounts according to its regulation. The regulation of the voltage of the machine Z may be accomplished and its sign adjusted by placing a regulating resistance and reversing switch $R_s$ in circuit with the field $n$ of the auxiliary machine Z. The field N of the compensating machine P is shown as connected across the plus and minus mains. It will be understood, however, that the field may be of any suitable type and may be provided with other means for regulation. The auxiliary machine Z is shown as mechanically coupled to the compensating machine P. It may, however, be driven separately. The motor M and the compensating and auxiliary machines P and Z having been started up in any suitable manner, and being suitably excited, the energy storing mass S will store up a certain amount of energy. The storing of the energy is accomplished by making the sum of the counter-electromotive forces of the machines P and Z less than the potential between the plus and minus mains, which may be accomplished by regulating either or both of the fields N or $n$ and by even reversing the polarity of the machine Z. By increasing the sum of the voltages of the machines Z and P above that between the plus and minus mains in a similar manner, the energy stored in the mass S may be wholly removed from it; that is, its energy may be utilized until its speed becomes as near zero as is desired. From the foregoing it will be seen that energy may be stored in the mass S connected to the compensating machine P by supplying a variable potential to the compensating machine, and that for this purpose an additional machine is used, which increases the speed of the compensating machine and thus charges the energy storing mass, while an electric potential generated in the direction of the counter-electromotive force of the compensating machine causes a discharge of the energy stored in the mass. The call on the compensating machine may be effected by hand, as would be the case in manipulating the regulator $R_s$, or it may be effected automatically, as by providing suitable windings upon the machine, of which more will be said later.

Fig. 2 is an arrangement of the motor M, the compensating machine P and the auxiliary machine Z, similar to that shown in Fig. 1, the only difference being that the machine Z is connected in one of the supply mains outside the connections of the motor M, and, in this figure, the illustration of some of the details have been simplified over Fig. 1.

Referring to Figs. 3 and 4, a modification is shown in which, in addition to the additional machine Z and compensating machine P a starting machine $A_1$ is provided. This starting machine is used in order to avoid the losses of energy arising from the use of starting resistances. The starting machine generates a counter electromotive force, and by gradually reducing the counter electromotive force by the regulator V of the field $v$, the motor to be started is gradually brought to the voltage of the line. The starting machine can, as shown in Figs. 3 and 4, be connected directly to the compensating machine, while the arrangement and operation of the auxiliary machine Z is the same as before. Figs. 3 and 4 show similar constructions except that in Fig. 3, the left hand motor terminal is connected to the junction between P and Z, while in Fig. 4, the left hand motor terminal is connected directly to the line. The machine Z is provided with a field $n$ and a regulator $R^s$ of similar construction to that shown in Fig. 1, and it performs a similar function, namely, to vary and control the electromotive force of the machine Z, and thus cause the energy to be stored in the fly wheel S and discharged into the motor M as required. The machine A' is a counter-electromotive force machine of well known construction and is provided with a field $v$ and a regulator V so that the strength of the field, and therefore the electromotive force of the machine A' may be controlled. The regulator V may be of any suitable and well known construction.

In the construction shown in Fig. 5, the machine Z instead of being manually controlled, as in Figs. 1 to 4 inclusive, is controlled automatically by providing a series field $m$ in the outer circuit, a suitable shunt field $n$ being also provided. In this case, the excitation of Z is dependent upon the current flowing in the outer circuit, and thus the voltage of Z will be automatically controlled, causing energy to be automatically stored and discharged.

In the arrangements hereinbefore described the energy storing mass is mounted on a special compensating machine and the energy stored by the mass is, during the working period, delivered to the motor M as electrical energy. It is however possible to arrange the energy storing mass upon the motor M so that the motor does not receive the stored energy as electrical energy. Such an arrangement would be advantageous in connection with "three pass", rolling mills, for example. The motor M is coupled to the energy storing mass and the supply of current to the motor M and the coming into action of the said mass can be regulated at will or instead of connecting the energy storing mass directly to the motor M the inertia mass may be mounted on a motor generator from which the motor M receives its energy, the motor generator receiving its driving power from an alternating current system. An equivalent of a motor generator would be a rotary converter or transformer having only one winding. It is possible in this case to use a single asynchronous transformer which is provided with the energy storing mass and to utilize the energy stored therein when the demand for current fluctuates. The asynchronous transformer differs from the synchronous transformer in that it does not run synchronously with the frequency but slips according to the load. In order that the asynchronous machine may supply direct current, the brushes may be rotated with a velocity corresponding to the slip as is well known. This rotation may be obtained in any suitable manner. If a transformer (whether synchronous or asynchronous) with one winding be used the voltage available on the direct current side is constant if the alternating voltage is constant. For starting the motor the voltage must however be gradually increased from zero. In order to dispense with starting resistance in which a great loss of energy always takes place, advantage is taken of the fact that the resistance may be replaced by counter electromotive force, the transformer supplying the direct current required to work the winding motor being switched in series with a direct current starting machine with which it is directly or indirectly, mechanically or electrically coupled. The counter electromotive force generated by this starting machine is used instead of a starting resistance when the motor M is being started.

Referring to Figs. 6 and 7 L represents the three phase mains, G a converter, $A_1$ the starting machine connected in series with the direct current side of the converter and coupled therewith directly or indirectly. The excitation windings and the regulating resistances have for the sake of clearness been omitted from these figures. The starting of the motor M is accomplished as follows: The starting machine A, which, as previously stated, may be driven by direct coupling with the converter, is excited in a direction to oppose the potential of the converter. Its armature circuit which is in series with the motor M is then closed and the voltage of the machine is gradually reduced, so that the voltage at the terminals of the motor M is raised, whereby it may be gradually brought up to the desired speed. The effect of the machine A may now be withdrawn by short-circuiting, or its potential may be reversed and added to that of the converter to assist in driving the motor M. When the starting machine $A_1$, is short circuited the normal working of the motor M corresponds to the voltage of the converter, while under normal circumstances, the additional voltage so increases the voltage at the terminals of the motor M that it is higher than the voltage of the converter. In the arrangement of connection shown in Fig. 6 the starting machine $A_1$ must, during the starting period, work against the full pressure of the converter. The size of the starting machine $A_1$ may be considerably reduced by dividing the total voltage and causing the starting machine to first work against the fractional voltage and, when the latter has reached its full value at the motor M an additional voltage is obtained by reversing the starting machine. In using transformers with a single winding it is usual in many cases, to place transformers in the primary circuit, and transform the voltage of the three-phase current in the line to the three-phase voltage required for the voltage of the direct current of the converter. In Fig. 7, T is the transformer connected to the rotary converter, the secondary of this transformer being star connected or provided in any other manner with a neutral point. In lieu of the three-phase transformer, a transformer having any other suitable number of phases may be used. The neutral point of the transformer T is connected with one pole of the starting machine $A_1$, while the other pole is connected to a contact $k_1$. One pole of the rotary converter is accordingly connected to a contact $k_2$ and the motor M may according to the position of lever $h$ be connected with either the contact $k_1$ or the contact $k_2$. During the starting period the lever $h$ is on the contact $k_1$ and the starting machine $A_1$ generates counter electro-motive force so that the motor M starts slowly. The counter-electro-motive force of the starting machine $A_1$ is then caused to change its direction by passing through the zero value, so that, at the end of the starting operation, the motor M has the full voltage of the transformer. The lever $k$ can then be simply placed in contact $k_2$ which corresponds to the normal working of the motor M. The change of direction of the voltage of the machine A, (i. e. its passage through the zero value) may be accomplished by means of a regulator as $R_3$, as described in connection with Fig. 1, in its field circuit. This method has the advantage that the starting machine $A_1$ has only to overcome half the pressure during the starting period and can therefore be proportioned for a correspondingly smaller output.

The regulator shown in Fig. 8 has for its object to regulate the voltage of the additional machine Z or of the compensating machine P in accordance with the angular velocity of the energy storing mass in other words to vary the supply of current from the compensating machine P in accordance with the load on the motor M or on the mains. As shown in the drawing the regulator $R_3$ which alters for instance the voltage of the additional machine Z is driven by a centrifugal governor $R_4$ through the medium of an electro-magnet E and of a differential gearing. The magnet E has, as shown in the drawings, two windings, namely a field winding which is in parallel with the motor M and a main winding in series with the circuit of the motor M. When the motor M, or, the mains, are gradually loaded, the torque of the magnet E increases with the load and the regulator $R_3$ is turned by the bevel wheels an amount corresponding to the required supply of current from the compensating machine P. The gradual decrease of the revolutions of the energy storing mass resulting therefrom causes a reduction of the additional voltage of the machine P. The centrifugal governor $R_4$ which is connected to the energy storing mass causes then a gradual movement of the regulator $R_3$ until the energy storing mass has parted entirely with its energy. When the load on the motor M, or the mains, is removed, the working of the arrangement takes place in the reverse direction. By suitably braking the forces acting on the governor $R_4$ and magnet E and suitably proportioning the friction of the regulator $R_3$ it is easy to effect the regulation in such a manner that the centrifugal governor $R_4$ and the magnet E do not influence each other to cause either to turn in the wrong direction.

Without being limited to the precise construction shown and described what we claim is, 1. The combination with a source of electrical supply, of an electric motor, a compensating machine connected in circuit with said motor, an energy storing device connected to said machine, and means connected in circuit with said machine whereby the said machine may be caused to discharge the energy of said device into said motor, substantially as described.

2. The combination with a source of electrical supply, of an electric motor, a compensating machine connected in circuit with said motor, an energy storing device connected to said machine, and means separate from the field excitation for varying the voltage of the compensating machine circuit, whereby the said machine may be caused to discharge the energy of said device into said motor, substantially as described.

3. The combination with a source of electrical supply, of an electric motor, a compensating machine connected in circuit with said motor, an energy storing device connected to said machine, and an auxiliary machine connected in circuit with said compensating machine whereby the said compensating machine may be caused to discharge the energy of said device into said motor, substantially as described.

4. The combination with a source of electrical supply, of an electric motor, a compensating machine connected in circuit with said motor, an energy storing device connected to said machine, an auxiliary machine having an armature in circuit with said compensating machine, whereby the said compensating machine may be caused to discharge the energy of said device into said motor, and means for regulating the said auxiliary machine, substantially as described.

5. The combination with a source of electrical supply, of an electric motor connected between the terminals of said source, a compensating machine connected in a circuit between said terminals, an energy storing device connected to said compensating machine, and means for varying the voltage between the terminals of the circuit containing said compensating machine, substantially as described.

6. The combination with a source of electrical supply, of an electric motor connected between the terminals of said source, a compensating machine connected in a circuit between said terminals, an energy storing device connected to said compensating machine, and means for varying the voltage between the terminals of the circuit containing said compensating machine, substantially as described.

7. The combination with a source of electrical supply, of an electric motor, a compensating machine connected in circuit with said motor, an energy storing device connected with said machine, an auxiliary machine whereby the said compensating machine may be caused to discharge the energy of said device into said motor, and means for regulating said auxiliary machine, said auxiliary and compensating machines being mechanically connected together, substantially as described.

8. The combination with a source of electrical supply, of an electric motor connected between the terminals of said source, an auxiliary machine and a compensating machine connected in series between the terminals of said source, means for regulating said auxiliary machine, and an energy storing device connected to said compensating machine, substantially as described.

9. The combination with a source of electrical supply, of an electric motor connected between the terminals of said source, an auxiliary machine and a compensating machine connected in series between the terminals of said source and mechanically connected together, means for regulating said auxiliary machine, and an energy storing device connected to said compensating machine, substantially as described.

10. The combination with a source of electrical supply, of an electric motor connected between the terminals of said source, a starting machine connected in series with said motor between said terminals, a compensating machine connected between said terminals, an energy storing device connected to said compensating machine, and means whereby said compensating machine discharges the energy of said device, said starting and compensating machines being mechanically connected together, substantially as described.

11. The combination with a source of electrical supply, of an electric motor connected between the terminals of said source, a starting machine connected in series with said motor between said terminals, a compensating machine, an auxiliary machine, said compensating and auxiliary machines being connected in series between said terminals, and an energy storing device connected to said compensating machine, said starting, compensating and auxiliary machines being mechanically connected together, substantially as described.

12. The combination with a source of electrical supply of a compensating machine, an energy storing device connected to said compensating machine, an auxiliary machine connected in series with said compensating machine between the terminals of said source, a working motor having one terminal connected to the junction of said compensating and auxiliary machines, a starting machine having one of its terminals connected to the other terminal of said motor, the other terminal of said starting machine being connected to a terminal of said source, and means for regulating the potential of said auxiliary machine, substantially as described.

13. The combination with a source of electrical supply of a compensating machine, an energy storing device connected to said compensating machine, an auxiliary machine connected in series with said compensating machine between the terminals of said source, a working motor having one terminal connected to the junction of said compensating and auxiliary machines, a starting machine having one of its terminals connected to the other terminal of said motor, the other terminal of said starting machine being connected to a terminal of said source, and means for regulating the potential of said auxiliary machine at will, substantially as described.

14. In a system of electrical distribution, the combination with current supplying line conductors, of a compensating electric machine adapted to store mechanical energy and release it subsequently as electrical energy, and connected with the line conductors, and a booster interposed in the connection between the said compensating electric machine and one of the line conductors.

15. The combination with a supply circuit, and a working circuit receiving energy therefrom, of a dynamo-electric machine connected in said working circuit, an energy storing device connected to said machine, and means connected in circuit with said machine adapted to cause the energy stored in said device to be discharged into the working circuit.

16. The combination with a supply circuit, and a working circuit receiving energy therefrom, of a dynamo-electric machine connected in said working circuit, an energy storing device connected to said machine, an auxiliary machine in circuit with said dynamo-electric machine, and means for controlling said machine to cause the energy stored in said device to be discharged into the working circuit.

17. In a system of electrical distribution, the combination of a source of supply and a working circuit, a compensating electric machine adapted to store mechanical energy and to release it subsequently as electrical energy, and connected in multiple with said source of supply, and a booster interposed in the circuit in series with the compensating electric machine.

18. In a system of electrical distribution, the combination of a source of supply and a working circuit, a compensating electric machine adapted to store mechanical energy and to release it subsequently as electrical energy, and connected in multiple with said source of supply, a booster interposed in the circuit in series with the compensating electric machine, and a regulatable field winding for said booster adapted to govern the storing and releasing of the mechanical energy.

19. In a system of electrical distribution, the combination of a source of supply and a working circuit, a compensating electric machine embodying a rotary member adapted to store mechanical energy and subsequently release it as electrical energy, and having its armature connected in multiple with said source of supply, and a booster having its armature connected in series with the armature of the compensating machine.

In testimony whereof we have signed our names to this specification in the presence of two subscribing witnesses.

KARL HERTWIG.
FRIEDEL COLLISCHONN.

Witnesses:
ERWIN DIPPEL,
MICHAEL VOLKE.